(12) United States Patent
Zhu et al.

(10) Patent No.: US 9,326,290 B2
(45) Date of Patent: Apr. 26, 2016

(54) RESOURCE SCHEDULING METHOD, APPARATUS AND BASE STATION

(75) Inventors: Zhiqiu Zhu, Beijing (CN); Jian He, Beijing (CN); Mingyu Xu, Beijing (CN)

(73) Assignee: Datang Mobile Communications Equipment Co., Ltd. (CN)

( * ) Notice: Subject to any disclaimer, the term of this patent is extended or adjusted under 35 U.S.C. 154(b) by 319 days.

(21) Appl. No.: 13/994,205

(22) PCT Filed: Dec. 15, 2011

(86) PCT No.: PCT/CN2011/084031
§ 371 (c)(1),
(2), (4) Date: Jul. 16, 2013

(87) PCT Pub. No.: WO2012/079517
PCT Pub. Date: Jun. 21, 2012

(65) Prior Publication Data
US 2013/0294247 A1 Nov. 7, 2013

(30) Foreign Application Priority Data

Dec. 16, 2010 (CN) .......................... 2010 1 0593025

(51) Int. Cl.
*H04W 4/00* (2009.01)
*H04W 72/04* (2009.01)
*H04W 72/08* (2009.01)

(52) U.S. Cl.
CPC ........ *H04W 72/0486* (2013.01); *H04W 72/082* (2013.01)

(58) Field of Classification Search
None
See application file for complete search history.

(56) References Cited

U.S. PATENT DOCUMENTS

| | | | | |
|---|---|---|---|---|
| 8,194,603 | B2* | 6/2012 | Nimbalker et al. | 370/329 |
| 8,717,979 | B2* | 5/2014 | Tsai et al. | 370/329 |
| 2009/0245194 | A1* | 10/2009 | Damnjanovic et al. | 370/329 |
| 2009/0270109 | A1* | 10/2009 | Wang Helmersson et al. | 455/453 |
| 2010/0027521 | A1* | 2/2010 | Huber et al. | 370/338 |

(Continued)

FOREIGN PATENT DOCUMENTS

| CN | 1735270 A | 2/2006 |
|---|---|---|
| CN | 101547514 A | 9/2009 |

(Continued)

*Primary Examiner* — Phirin Sam
(74) *Attorney, Agent, or Firm* — DLA Piper LLP (US)

(57) ABSTRACT

Disclosed are a resource scheduling method, apparatus and base station for reducing the signaling overhead of the downlink control channel instruction in uplink and downlink data transmission. The method comprises: configuring semi-persistent scheduling parameters for a user equipment (UE) when the cell of the UE is determined to be an interference limited cell and a semi-persistent scheduling mechanism needs to be set for the UE; allocating semi-persistent scheduling resources to the UE for transmitting service data according to the semi-persistent scheduling parameters when the UE is determined to be in need of a semi-persistent scheduling mechanism for transmitting the service data of access services; sending the resource scheduling information of the semi-persistent scheduling resources to the UE over the downlink control channel of the UE. The technical solution provided in the present application reduces the signaling overhead of the downlink control channel instruction during data transmission, reduces inter-cell interference of the downlink control channel, and improves the reception capability of the downlink control channel, quality of service (QoS) and cell spectrum efficiency.

18 Claims, 2 Drawing Sheets

(56) References Cited

U.S. PATENT DOCUMENTS

2011/0081865 A1* 4/2011 Xiao et al. .................. 455/63.1
2011/0149879 A1* 6/2011 Noriega et al. .............. 370/329
2013/0295921 A1* 11/2013 Bhargava et al. .......... 455/426.1

FOREIGN PATENT DOCUMENTS

| CN | 101677466 A | 3/2010 |
| CN | 102056174 A | 5/2011 |

* cited by examiner

RESOURCE SCHEDULING METHOD, APPARATUS AND BASE STATION

This application is a U.S. National Stage of International Application No. PCT/CN2011/084031, filed Dec. 15, 2011, designating the United States, and claiming the benefit of Chinese Patent Application No.: 201010593025.9, filed with the Chinese Patent Office on Dec. 16, 2010 and entitled "resource scheduling method, apparatus and eNB", both of which are hereby incorporated by reference in their entireties.

FIELD

The present invention relates to the field of communications and particularly to a resource scheduling method, apparatus and evolved NodeB (eNB).

BACKGROUND

At present, in order to lower intra-cell interference in a Long Term Evolution (LTE) system, a common scheme is adopted to transmit data through Orthogonal Frequency Division Multiplexing (OFDM) on a downlink control channel, and despite lowered intra-cell interference, this scheme may significantly increase Inter-Cell Interference (ICI) particularly as compared with a traditional 3G system. In order to lower inter-cell interference, a common scheme is adopted to transmit data through frequency multiplexing across cells, that is, to use different frequency bands for networking between adjacent cells. For example, there is an available networking scheme with a frequency multiplexing factor of 3, 4 or 7; and this networking scheme poses a significant challenge to the LTE system with a maximum system bandwidth of 20 MHz, for example, given a networking bandwidth of 20 MHz, the LTE system has to provide a bandwidth of 60 MHz if a frequency multiplexing factor of 3 is adopted; the LTE system has to provide a bandwidth of 80 MHz if a frequency multiplexing factor of 4 is adopted; and the LTE system has to provide a bandwidth of 140 MHz if a frequency multiplexing factor of 7 is adopted. However the scarcity of existing frequency resources makes it rather difficult to provide the foregoing bandwidths.

A key to an implementation of same-frequency networking in the LTE system lies in the anti-interference performance of a downlink control channel, and the feasibility to implement same-frequency networking in the LTE system can be guaranteed only if the anti-interference performance of the downlink control channel in the LET system is ensured to be achieved as required. In a network with a specific number of users, there are typically numerous demands for scheduling of uplink and downlink shared channels, and given same-frequency networking, a Physical Downlink Control Channel (PDCCH) has a high probability of being subject to strong interference of an adjacent cell, so that there is serious same-frequency interference of the PDCCH channel, thus greatly limiting the performance of receiving data on the downlink control channel. Since scheduling and resource allocation information of the uplink and downlink shared channels is borne on a downlink control channel (e.g., a PDCCH channel), the performance of receiving data on the downlink control channel poses significant influence upon the Quality of Service (QoS) of a user service.

In the LTE system, uplink and downlink shared channels are typically scheduled in two scheduling schemes, which are dynamic scheduling and Semi-Persistent Scheduling (SPS) respectively, and these two scheduling schemes will be detailed below respectively.

For dynamic scheduling, an eNB has to notify a User Equipment (UE) of resource allocation information of a corresponding sub-frame in real time per Transmission Timing Interval (TTI) to make full use of a shared channel resource; and to provide the UE with a data transmission service in the dynamic scheduling scheme, the eNB sends allocation information of a resource allocated to the UE on a PDCCH: for a Physical Downlink Shared Channel (PDSCH), resource allocation information of the PDSCH is sent to the UE on the PDCCH of a sub-frame n; and the UE receives the corresponding PDCCH information in the sub-frame n and receives downlink data information at a corresponding location of the PDSCH of the sub-frame n according to an indication of the PDCCH information; and for a Physical Uplink Shared Channel (PUSCH), resource allocation information of the PUSCH is sent to the UE on the PDCCH of a sub-frame n−k (k=4 for a frequency division duplex system; and the value of k depends upon a sub-frame configuration and a sub-frame number for a time division duplex system). Since the resource allocation information indicated by dynamic scheduling signaling is validated only in the current sub-frame but invalidated in other sub-frames, the eNB can allocate the resource in the other sub-frames without instructing the UE to reclaim the resource.

In order to guarantee the QoS of a user service, the eNB performs dynamic scheduling by determining UEs to be scheduled for transmission of data and allocating resources capable of bearing the amount of data (i.e., the size of a Transport Block (TB)) for these UEs to be scheduled, where the TB size is determined by the level of a Modulation and Coding Scheme (MCS) determined and the number of resource blocks allocated by the eNB. A result of dynamic scheduling can vary in real time, so resources can be scheduled in the dynamic scheduling scheme for data services with distinct burst characteristics of the size of a data packet, a time of arrival of traffic data, etc. Although the dynamic scheduling scheme can improve a utilization ratio of the shared channel resource, an uplink scheduling grant or downlink resource allocation information has to be indicated in real time on the PDCCH, so there is a drawback of a considerable overhead of control signaling for the use of the dynamic scheduling scheme.

Figure 1:
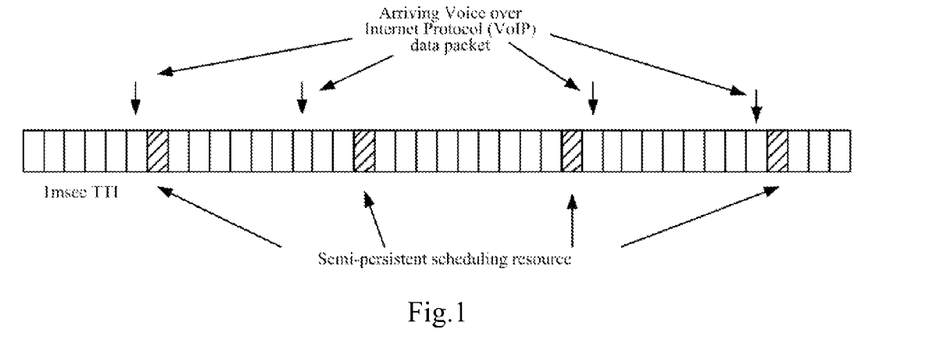
FIG. 1 is a schematic diagram of transmitting service data in the semi-persistent scheduling scheme in the prior art.

For semi-persistent scheduling, a Radio Resource Control (RRC) layer configures a corresponding UE with semi-persistent scheduling related parameters in RRC signaling, and the related parameters may include a Cell Radio Network Temporary Identity (C-RNTI), an uplink semi-persistent scheduling resource interval, a downlink semi-persistent scheduling resource interval, etc.; and a Media Access Control (MAC) layer of the eNB determines a semi-persistent scheduling resource to be activated for respective UEs, and upon determining a semi-persistent scheduling resource of a specific UE to be activated in a current sub-frame, a semi-persistent scheduling module allocates a corresponding resource by determining the locations and amount of the allocated resource, the amount of data that can be borne (a TB size, etc.), etc., and thereafter the UE is notified of activation information of the semi-persistent scheduling resource on a PDCCH channel scrambled with an SPS C-RNTI; and the UE determines from the semi-persistent scheduling resource intervals configured by the RRC layer the locations where the semi-persistent scheduling resource reoccurs (the locations can be as illustrated in FIG. 1 where boxes filled with slanted lines in FIG. 1 represent the configured semi-persistent scheduling resource) and transmits and receives data at the corresponding locations.

For an uplink shared channel, a semi-persistent scheduling resource can be deactivated by a UE on its own initiative, that is, released implicitly; and for uplink and downlink shared channels, a semi-persistent scheduling resource can be deactivated by an eNB on its own initiative. If the eNB determines that a specific UE using an active semi-persistent scheduling resource satisfies a condition to release the semi-persistent scheduling resource, the eNB can send an instruction on a PDCCH channel to deactivate the semi-persistent scheduling resource; and the UE will not transmit data or receive data periodically as per a configuration of semi-persistent scheduling any longer upon reception of the instruction sent from the eNB to deactivate the semi-persistent scheduling resource. In the LTE standard, semi-persistent scheduling is generally applicable to a service with both a fixed time of arrival of a data packet and a constant size of a data packet (e.g., a Voice over Internet Protocol (VoIP) service).

There is an insignificant demand of an UE for a PDCCH channel in transmission of data in the semi-persistent scheduling scheme, so an overhead of control channel signaling can be significantly saved; but in the existing LTE standard, if it is intended to reconfigure a semi-persistent scheduling resource interval, it has to be reconfigured in RRC signaling; and if it is intended to modify the size and location of a Physical Resource Block (PRB) resource, an MCS, a TB size or the like allocated for the UE, then they have to be indicated again on a PDCCH.

At present an eNB provides a UE with a data transmission service selectively through semi-persistent scheduling or dynamic scheduling dependent upon the type of a borne service, for example, the semi-persistent scheduling scheme for a VoIP service to save an overhead of control channel signaling, and the dynamic scheduling mechanism for other services (e.g., data services in the File Transfer Protocol (FTP), the Hyper Text Transfer Protocol (HTTP), Video Streaming, etc.) to improve a utilization ratio of a shared channel resource. Along with continued popularization of services, there are an increasing number of data services, and the use of the dynamic scheduling scheme has to be adopted for a large number of data services in the LTE system, so that there might be a serious load of a downlink control channel (e.g., a PDCCH channel) on which an uplink scheduling grant and downlink scheduling signaling is borne, thus resulting in serious inter-cell same-frequency interference to the downlink control channel with same-frequency networking in the LTE system, and consequently the problem of serious inter-cell same-frequency interference to the downlink control channel arising from a considerable overhead of control channel signaling may still exist with the use of the existing scheduling scheme.

SUMMARY

The invention provides a resource scheduling method, apparatus and eNB to lower an overhead of indication signaling on a downlink control channel in uplink and downlink transmission of data and thereby lower inter-cell interference of the downlink control channel and to improve the performance of reception by respective UEs on the downlink control channel and a QoS and a cell spectrum efficiency of the UEs.

A resource scheduling method includes:
determining whether to set a semi-persistent scheduling scheme for a User Equipment, UE, upon determining a cell serving the UE as an interference limited cell with a traffic load of a downlink control channel of the interference limited cell being above a preset traffic load threshold;

configuring the UE with semi-persistent scheduling parameters upon determining the semi-persistent scheduling scheme to be set for the UE;
allocating a semi-persistent scheduling resource for transmitting service data of an access service for the UE according to the semi-persistent scheduling parameters upon determining the UE to transmit the service data in the semi-persistent scheduling scheme; and
sending resource scheduling information of the allocated semi-persistent scheduling resource to the UE on the downlink control channel of the UE A resource scheduling apparatus includes:
a semi-persistent scheduling determining unit configured to determine whether to set a semi-persistent scheduling scheme for a User Equipment, UE, upon determining a cell serving the UE as an interference limited cell with a traffic load of a downlink control channel of the interference limited cell being above a preset traffic load threshold;
a semi-persistent scheduling parameter configuring unit configured to configure the UE with semi-persistent scheduling parameters when the semi-persistent scheduling determining unit determines the semi-persistent scheduling scheme to be set for the UE;
a semi-persistent scheduling resource allocating unit configured to allocate a semi-persistent scheduling resource for transmitting service data of an access service for the UE according to the semi-persistent scheduling parameters configured for the UE by the semi-persistent scheduling parameter configuring unit when the UE is determined to transmit the service data in the semi-persistent scheduling scheme; and
a semi-persistent scheduling resource notifying unit configured to send resource scheduling information of the semi-persistent scheduling resource, for transmitting the service data, allocated for the UE by the semi-persistent scheduling resource allocating unit to the UE on the downlink control channel of the UE.

An eNB includes the foregoing apparatus.

In the embodiments of the invention, when a cell serving a UE is determined as an interference limited cell with a traffic load of a downlink control channel of the interference limited cell being above a preset traffic load threshold, it is determined whether to set a semi-persistent scheduling scheme for the UE, and when the semi-persistent scheduling scheme is determined to be set for the UE, the UE is configured with semi-persistent scheduling parameters; when the UE is determined to transmit service data of an access service in the semi-persistent scheduling scheme, a semi-persistent scheduling resource for transmitting the service data is allocated for the UE according to the semi-persistent scheduling parameters; and resource scheduling information of the semi-persistent scheduling resource is sent to the UE on the downlink control channel of the UE. With the technical solution of the invention, on one hand, service data can be transmitted in the semi-persistent scheduling scheme for an access service of the UE (possibly including a data service and a voice service), and since there is an insignificant demand for the downlink control channel (e.g., a PDCCH channel) in transmission of data in the semi-persistent scheduling scheme and there are a large number of data services, an overhead of indication signaling on the downlink control channel in uplink and downlink transmission of data is lowered as a whole to thereby lower inter-cell interference of the downlink control channel; and on the other hand, the semi-persistent scheduling resource for transmitting the service data is allocated for the UE according to the semi-persistent scheduling parameters to thereby guarantee the performance of reception by the UE on the downlink control channel and improve a QoS and a cell spectrum efficiency of the UE.

DETAILED DESCRIPTION OF THE EMBODIMENTS

In view of the forgoing technical problem in the prior art, embodiments of the invention provide a resource scheduling method, apparatus and eNB to lower an overhead of signaling on a downlink control channel in uplink and downlink transmission of data and thereby lower inter-cell interference of the downlink control channel and to improve the performance of reception by respective UEs on the downlink control channel and a QoS and a cell spectrum efficiency of the UEs. The method includes: when a cell serving a UE is determined as an interference limited cell with a traffic load of a downlink control channel of the interference limited cell being above a preset traffic load threshold, it is determined whether to set a semi-persistent scheduling scheme for the UE, and when the semi-persistent scheduling scheme is determined to be set for the UE, the UE is configured with semi-persistent scheduling parameters; when the UE is determined to transmit service data of an access service in the semi-persistent scheduling scheme, a semi-persistent scheduling resource for transmitting the service data is allocated for the UE according to the semi-persistent scheduling parameters; and resource scheduling information of the allocated semi-persistent scheduling resource is sent to the UE on the downlink control channel of the UE. With the technical solution of the invention, on one hand, for the UE in the interference limited cell, when there is a heavy traffic load of the downlink control channel, if a semi-persistent scheduling resource is allowed by the access service of the UE for use, then the service data is transmitted for the access service of the UE (including a data service and a voice service) preferentially in the semi-persistent scheduling scheme, and since there is an insignificant demand for the downlink control channel (e.g., a PDCCH channel) in transmission of data in the semi-persistent scheduling scheme and there are a large number of data services, a signaling overhead of the downlink control channel in uplink and downlink transmission of data can be lowered as a whole to thereby lower inter-cell interference of the downlink control channel; and on the other hand, the semi-persistent scheduling resource for transmitting the service data can be allocated for the UE according to the semi-persistent scheduling parameters to thereby guarantee the performance of reception by the UE on the downlink control channel and improve a QoS and a cell spectrum efficiency of the UE.

The technical solution of the invention will be detailed below with reference to the drawings.

Figure 2:
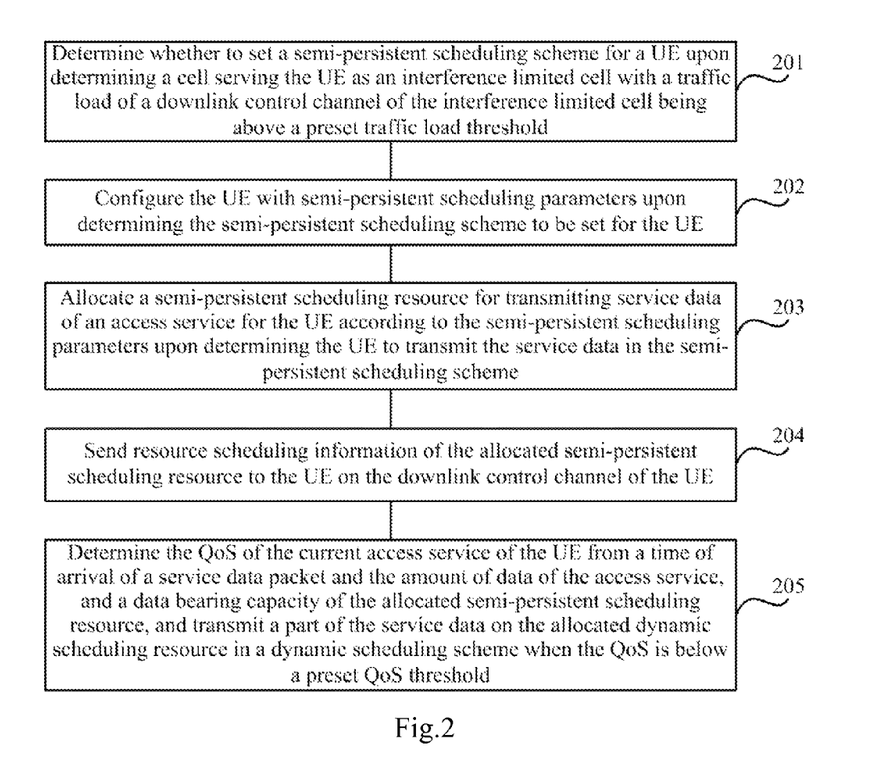
FIG. 2 is a flow chart of a resource scheduling method according to an embodiment of the invention.

FIG. 2 is a flow chart of a resource scheduling method according to an embodiment of the invention, and this method includes step 201 to step 205.

The step 201 is to determine whether to set a semi-persistent scheduling scheme for a UE upon determining a cell serving the UE as an interference limited cell with a traffic load of a downlink control channel of the interference limited cell being above a preset traffic load threshold.

The step 202 is to configure the UE with semi-persistent scheduling parameters upon determining the semi-persistent scheduling scheme to be set for the UE.

The step 203 is to allocate a semi-persistent scheduling resource for transmitting service data of an access service for the UE according to the semi-persistent scheduling parameters upon determining the UE to transmit the service data in the semi-persistent scheduling scheme.

The step 204 is to send resource scheduling information of the allocated semi-persistent scheduling resource to the UE on the downlink control channel of the UE.

In the foregoing steps, the interference limited cell refers to a cell with the demodulation performance of a downlink control channel being seriously influenced by same-frequency interference of an adjacent cell and depends upon factors including a channel context, the distance between station sites, etc., and in a real system, an interference limited cell can be determined in a common method in the prior art, where an interference limited cell can be determined in a link budget approach during planning of a network, and the downlink control channel can be a PDCCH channel.

In the foregoing step 201, it can be determined from current access services of the UE whether to set a semi-persistent scheduling scheme for the UE, particularly as follows: the semi-persistent scheduling scheme is determined to be set for the UE when at least one Guaranteed Bit Rate (GBR) service is determined among the current access services of the UE; and the semi-persistent scheduling scheme is determined not to be set for the UE when there is no GBR service among the current access services of the UE; or the semi-persistent scheduling scheme is determined to be set for the UE according to a preset strategy that the semi-persistent scheduling scheme shall be set for all UEs of the interference limited cell by default.

In an embodiment of the invention, the semi-persistent scheduling parameters configured for the UE can include semi-persistent scheduling resource intervals determined by the service type of a current access service of the UE; and the semi-persistent scheduling resource interval can include an uplink semi-persistent scheduling resource interval (i.e., semiPersistSchedIntervalUL) and a downlink semi-persistent scheduling resource interval (i.e., semiPersistSchedIntervalDL), both of which take the same value. The semi-persistent scheduling parameters can further include one or more of the following information: a semi-persistent scheduling C-RNTI, the number of Hybrid Automatic Repeat Request (HARD) processes reserved for downlink semi-persistent scheduling (i.e., numberOfConfSPS-Processes), a list of Acknowledgment (ACK)/Negative Acknowledgement (NACK) feedback resources for downlink semi-persistent scheduling (i.e., n1-PUCCH-AN-PersistentList), the number of blank transmission packets implicitly released in the uplink (i.e., implicitReleaseAfter), a normalized cell-specific parameter of uplink power control for semi-persistent scheduling transmission (i.e., p0-NominalPUSCH-Persistent), a UE-specific parameter of uplink power control for semi-persistent scheduling transmission (i.e., p0-UE-PUSCH-Peeersistent), a dual interval configuration (i.e., twoIntervalsConfig), etc., all of which can be set in the same IE and depicted in Table 1.

TABLE 1

Parameters included among semi-persistent scheduling parameters and their meanings

| Semi-persistent scheduling parameters | Descriptions and meaning of the parameters |
|---|---|
| semiPersistSchedC-RNTI | Semi-persistent scheduling C-RNTI to indicate the use of a current PDCCH for a radio network identifier of semi-persistent scheduling |
| semiPersistSchedIntervalDL | Downlink semi-persistent scheduling resource interval |
| Semi-persistent scheduling parameters | Descriptions and meaning of the parameters |
| numberOfConfSPS-Processes | The number of Hybrid Automatic Repeat Request (HARD) processes reserved for downlink semi-persistent scheduling |
| n1-PUCCH-AN-PersistentList | List of ACK/NACK feedback resources for downlink semi-persistent scheduling |
| semiPersistSchedIntervalUL | Uplink semi-persistent scheduling resource interval |
| implicitReleaseAfter | The number of blank transmission packets implicitly released in the uplink |
| p0-NominalPUSCH-Persistent | Normalized cell-specific parameter of uplink power control for semi-persistent scheduling transmission |
| p0-UE-PUSCH-Peeersistent | UE-specific parameter of uplink power control for semi-persistent scheduling transmission |
| twoIntervalsConfig | Dual interval Configuration to determine temporal locations where an uplink semi-persistent scheduling resource of a Time Division Duplex (TDD) system reoccurs |

To configure the respective parameters in SPS-Config, the uplink semi-persistent scheduling resource interval and the downlink semi-persistent scheduling resource interval are configured as determined by the service type of a current access service of the UE; and since the uplink semi-persistent scheduling resource interval and the downlink semi-persistent scheduling resource interval have a significant influence upon the QoS of the current access service of the UE, the uplink semi-persistent scheduling resource interval and/or the downlink semi-persistent scheduling resource interval shall be configured by accounting for both an arrival characteristic of a service data packet (i.e., arrival interval information of the data packet, particularly the mean, the variance, etc., of the interval) and a QoS requirement of the access service, e.g., a transmission delay requirement of service data.

Preferably when service data of a plurality of access services of the UE needs to be transmitted in the semi-persistent scheduling scheme, the UE is configured with the semi-persistent scheduling parameters by configuring semi-persistent scheduling resource intervals corresponding to each of the access services according to a QoS and an arrival characteristic of a service data packet of the access service and configuring the semi-persistent scheduling resource intervals of the UE as the smallest ones of the semi-persistent scheduling resource intervals corresponding to the plurality of access services.

For example, for a VoIP service, an arrival interval of a voice packet during an active period of the service is approximately 20 ms, and given an end-to-end delay of no more than 100 ms, which is a QoS index, a delay tolerable to transmission via an air interface is approximately 50 ms, that is, for the VoIP service, a voice packet shall be transmitted to an opposite end in 50 ms after arriving at a buffer area at an Radio Link Control (RLC) protocol layer, and 4 HARQ transmission periods of time are reserved (e.g., 4 HARQ transmission periods of time of approximately 40 ms are reserved in a Time Division Duplex (TDD) system, and 4 HARQ transmission periods of time of approximately 32 ms are reserved in a Frequency Division Duplex (FDD) system). In summary an uplink semi-persistent scheduling resource interval and a downlink semi-persistent scheduling resource interval of the VoIP service can be set respectively to 20 ms.

For a 64 kbps Video Streaming (VS) service, as required for data transmission of the service, arrival characteristics of a data packet include occurrence of 8 data packets in a data frame, an interval of 100 ms between data frames and respective data packets in a data frame arriving in compliance with a truncated Pareto distribution with a mean of 6 ms and a maximum of 12.5 ms. For the 64 kbps VS service with a 12.5 ms arrival interval of a data packet, as required for the QoS of the video streaming service, there is an end-to-end transmission delay of no more than 150 ms, a maximum delay tolerable to transmission via an air interface is approximately 100 ms, 4 HARQ transmission periods of time are reserved, and there is a maximum delay of approximately 60 ms awaited after a data packet arrives at an RLC layer buffer area. As such, an uplink semi-persistent scheduling resource interval and a downlink semi-persistent scheduling resource interval of the video streaming service can be set to 40 ms.

When both a VoIP service and a 64 kbps VS service are active for the UE, the uplink semi-persistent scheduling resource interval and the downlink semi-persistent scheduling resource interval of the video streaming service can be set to 20 ms.

The corresponding parameters in Table 1 above are configured as above in a specific configuration format which can be implemented as an SPS-Config information element as defined in the LTE standard, and specific contents of IE SPS-Config are as follows:

```
ASN1START
SPS-Config ::= SEQUENCE
SPS-Config ::= SEQUENCE
{
    semiPersistSchedC-RNTI      C-RNTI          OPTIONAL,   -- Need OR
    sps-ConfigDL                SPS-ConfigDL    OPTIONAL,   -- Need ON
    sps-ConfigUL                SPS-ConfigUL    OPTIONAL    -- Need ON
}
SPS-ConfigDL ::= CHOICE
{
    release                     NULL,
    {
    setup                       SEQUENCE
    {
    semiPersistSchedIntervalDL          ENUMERATED
    {
        sf10, sf20 , sf32, sf40 , sf64 , sf80,
        sf128, sf160 , sf320 , sf640 , spare6,
```

```
                                    spare5, spare4 , spare3 , spare2 ,
                                    spare1
          },
          numberOfConfSPS-Processes       INTEGER (1..8) ,
          n1-PUCCH-AN-PersistentList      N1-PUCCH-AN-PersistentList,
          ...
          }
    }
    SPS-ConfigUL ::= CHOICE
    {
        release                     NULL,
        setup                       SEQUENCE
        {
        semiPersistSchedIntervalUL          ENUMERATED
        {
                                    sf10, sf20 , sf32, sf40 , sf64 , sf80,
                                    sf128, sf160 , sf320 , sf640 , spare6,
                                    spare5, spare4 , spare3 , spare2 ,
                                    spare1
        },
        implicitReleaseAfter            ENUMERATED {e2, e3, e4, e8},
        p0-Persistent                   SEQUENCE
        {
            p0-NominalPUSCH-Persistent       INTEGER (-126..24) ,
            p0-UE-PUSCH-Persistent           INTEGER (-8..7)
        }
            OPTIONAL,                                    -- Need OP
    twoIntervalsConfig              ENUMERATED {true}    OPTIONAL,-- Cond TDD
        ...
        }
    }
    N1-PUCCH-AN-PersistentList ::= SEQUENCE (SIZE (1..4)) OF INTEGER (0..2047)
    -- ASN1STOP
```

In the foregoing step 203, the semi-persistent scheduling resource for transmitting the service data is allocated for the UE according to the semi-persistent scheduling parameters as follows: the amount of data (i.e., a TB size) to be borne on the allocated resource is determined from an arrival characteristic of a service data packet of a current access service of the UE and the semi-persistent scheduling resource intervals among the semi-persistent scheduling parameters; an MCS level supported by the UE is determined from a channel condition of the UE; and the number of PRBs for transmitting the service data is determined from the TB size and the MCS level, and the corresponding number of PRBs are allocated.

In the LTE standard, a correspondence relationship between a TB size, a number of allocated PRBs and an MCS is preset, so any of the parameters including the TB size, the number of allocated PRBs and the MCS can be determined as long as the remaining two parameters are given.

In the foregoing step 203, the TB size is determined from the arrival characteristic of a service data packet of a current access service of the UE and the semi-persistent scheduling resource intervals among the semi-persistent scheduling parameters particularly as follows: for a VoIP service, given the size of a voice data packet of approximately 320 bits, an interval between data packets of approximately 20 ms and the semi-persistent scheduling resource intervals of 20 ms, the amount of data to be borne per semi-persistent scheduling transmission is approximately 320 bits in transmission of data in the semi-persistent scheduling scheme, so a physical resource capable of bearing 320 bits shall be allocated as the semi-persistent scheduling resource. In another example, for a 64 kbps video streaming service, there are assumed the size of a video streaming data packet in compliance with a truncated Pareto distribution with an average size of the video streaming data packet of approximately 50 bytes and the size of the video streaming data packet ranging from 20 to 125 bytes, and semi-persistent scheduling resource intervals of the video streaming service of approximately 40 ms (that is, scheduled 2.5 times per 100 ms), that is, the number of data packets per scheduling is 8/2.5=3.2 data packets. A TB size of the 64 kbps video streaming service can be determined in the following three schemes: the TB size is determined as the minimum value of the size of the video streaming data packet in a first scheme; the TB size is determined as the maximum value of the size of the video streaming data packet in a second scheme; and the TB size is determined as the statistical average of the size of the video streaming data packet in a third scheme. With the first scheme, there is a high resource utilization ratio of a shared channel, but a considerable extra dynamic scheduling is required; with the second scheme, no extra dynamic scheduling is required, but there is a considerable resource waste of a shared channel; and with the third scheme, there is a high resource utilization ratio of a shared channel and little extra dynamic scheduling is required, so the TB size is typically determined in the third scheme, and the amount of data to be borne on the semi-persistent scheduling resource each time is approximately 50 bytes*3.2=160 bytes.

In the foregoing step 203, the MCS level supported by the UE can be determined from the channel transmission condition of the UE particularly in a common method in the prior art where in the uplink, the eNB measures and revises Channel Quality Information (CQI) in a Sounding Reference Signal (SRS) sent from the UE and determines the MCS level currently supported by the UE from the revised CQI information; and in the downlink, the eNB revises a newly reported CQI against a historical data transmission condition of the UE and determines the MCS level currently supported by the UE from the revised CQI information. Typically the uplink CQI or the downlink CQI from which the MCS level currently supported by the UE is determined is smoothed information because the MCS level will not be changed in a semi-persistent scheduling process.

In the foregoing step 203, the number of PRBs for transmitting the service data can be determined particularly as follows: the number of PRBs for semi-persistent scheduling allocated for the UE is determined from the determined TB size and MCS level currently supported by the UE in a preset correspondence relationship between a TB size, an MCS level and a number of PRBs.

In an embodiment of the invention, an MAC layer can schedule data by transmitting the data in the semi-persistent scheduling scheme after the RRC layer configures the UE successfully with the semi-persistent scheduling parameters. For example, for a VoIP service, the eNB can activate the semi-persistent scheduling scheme on an SPS C-RNTI scrambled PDCCH and determine an MCS level and a TB size of the UE upon detecting the semi-persistent scheduling scheme to be adopted for the UE.

Preferably in order to better accommodate dynamic variability of a data service (.e.g, a data service with a distinct burst characteristic) to guarantee the QoS of the service, the foregoing flow can further include:

The step 205 is to determine the QoS of the current access service of the UE from a time of arrival of a service data packet and the amount of data of the access service, and a data bearing capacity of the allocated semi-persistent scheduling resource, and to allocate a dynamic scheduling resource for a part of service data of the access service and transmit the part of the service data on the allocated dynamic scheduling resource in a dynamic scheduling scheme when the QoS does not reach a preset requirement, for example, the value of an index of the QoS is below a preset QoS threshold.

In this step, whether to transmit the part of the data exceeding the bearing capacity of semi-persistent scheduling in the dynamic scheduling mechanism can be determined from the length of time for which the service data for which the semi-persistent scheduling resource has been allocated waits for scheduling in a buffer area, for example, given a delay $\tau_0$ in transmission via an air interface of a specific service, a maximum delay $\tau_1$ in transmission via the air interface after HARQ periods of time are reserved, and the length of time t for which service data the first to arrive at a buffer area at present waits for scheduling, then the part of the data exceeding the bearing capacity of semi-persistent scheduling is determined to be transmitted in the dynamic scheduling mechanism when $t > \tau_1$ and there is no semi-persistent scheduling resource active in a current sub-frame.

In an embodiment of the invention, for a UE in a non-interference-limited cell, transmission of data in a traditional scheduling solution (for example, service data of a VoIP service is transmitted in a semi-persistent scheduling scheme, and a data service is transmitted in a dynamic scheduling scheme) is generally applicable to the following application scenarios: for a PDCCH with a limited coverage, same-frequency interference of the PDCCH channel is not a predominant factor limiting the performance of reception on the PDCCH channel; and with a light load of the system, the PDCCH channel is also lightly loaded and can guarantee the performance of reception on the PDCCH channel.

In an embodiment of the invention, there is a solution in which a data service is transmitted preferentially in a semi-persistent scheduling scheme with a dynamic scheduling being supplementary and which is generally applicable to the following application scenarios: a current cell is determined as an interference-limited cell during initial planning of a network, and the interference-limited cell can be determined in a link budget approach; and a current cell is determined as an interference-limited cell with a PDCCH load of the cell detected to be above a preset load threshold.

Preferably a traffic load of the downlink control channel in the interference-limited cell in a current cycle can be determined as follows: the traffic load of the downlink control channel in the current cycle is determined from a traffic load of the downlink control channel in the interference-limited cell in a preceding cycle, a resource utilization ratio of the downlink control channel in the current cycle and a smoothing coefficient. For example, the eNB monitors a PDCCH load level of the cell and determines a data service of the cell to be transmitted in the semi-persistent scheduling scheme when a statistic of the PDCCH load in a period of time T reaches a preset load threshold. For example, a statistic of a PDCCH load $L_{PDCCH(n)}$ in a period of time (n−1) T~NT (i.e., the n-th statistic cycle) is made in Equation (1) of:

$$L_{PDCCH(n)} = (1-\alpha) \times L_{PDCCH(n-1)} + \alpha \times \eta_{PDCCH(n)} \quad \text{Equation (1)}$$

In Equation (1), $L_{PDCCH(n)}$ is a PDCCH load of the cell in the n-th cycle, $L_{PDCCH(n-1)}$ is a PDCCH load of the cell in the (n−1)-th cycle, $\eta_{PDCCH(n)}$ is a resource utilization ratio measured really in the n-th cycle, and $\alpha$ is a smoothing coefficient.

Figure 3:
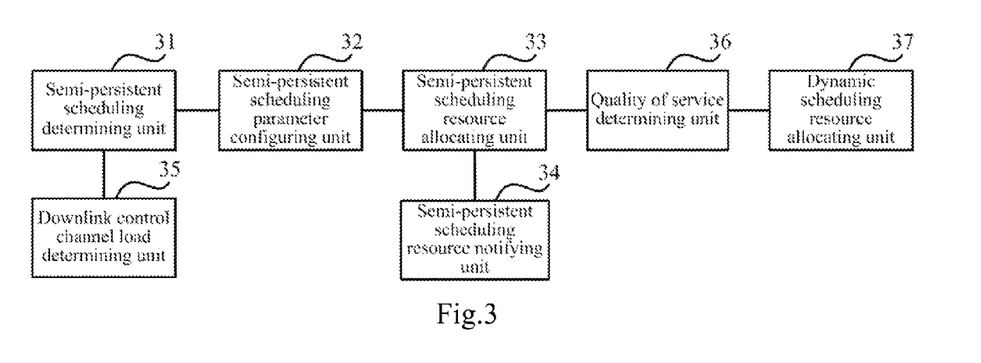
FIG. 3 is a schematic structural diagram of a resource scheduling apparatus according to an embodiment of the invention.

Based upon the same idea as the flow of the foregoing method, an embodiment of the invention further provides a resource scheduling apparatus structured as illustrated in FIG. 3.

Referring to FIG. 3, the resource scheduling apparatus according to the embodiment of the invention includes:

A semi-persistent scheduling determining unit 31 configured to determine whether to set a semi-persistent scheduling scheme for a UE upon determining a cell serving the UE as an interference limited cell with a traffic load of a downlink control channel of the interference limited cell being above a preset traffic load threshold.

A semi-persistent scheduling parameter configuring unit 32 configured to configure the UE with semi-persistent scheduling parameters when the semi-persistent scheduling determining unit 31 determines the semi-persistent scheduling scheme to be set for the UE.

A semi-persistent scheduling resource allocating unit 33 configured to allocate a semi-persistent scheduling resource for transmitting service data of an access service for the UE according to the semi-persistent scheduling parameters configured for the UE by the semi-persistent scheduling parameter configuring unit 32 when the UE is determined to transmit the service data in the semi-persistent scheduling scheme.

A semi-persistent scheduling resource notifying unit 34 configured to send resource scheduling information of the semi-persistent scheduling resource, for transmitting the service data, allocated for the UE by the semi-persistent scheduling resource allocating unit 33 to the UE on the downlink control channel of the UE.

Preferably the apparatus can further include:

A downlink control channel load determining unit 35 configured to determine a traffic load of the downlink control channel in the interference-limited cell in a current cycle from a traffic load of the downlink control channel in a preceding cycle, a resource utilization ratio of the downlink control channel in the current cycle and a smoothing coefficient and to initiate the semi-persistent scheduling determining unit 31 when the traffic load is above a preset load threshold.

Preferably the semi-persistent scheduling determining unit 31 is particularly configured to determine the semi-persistent scheduling scheme to be set for the UE upon determining at least one Guaranteed Bit Rate (GBR) service among current access services of the UE, and otherwise, determine the semi-persistent scheduling scheme not to be set for the UE; or to determine the semi-persistent scheduling scheme to be set for the UE according to a preset strategy that the semi-persistent scheduling scheme shall be set for all the UEs in the interference-limited cell by default.

Preferably the semi-persistent scheduling parameters include semi-persistent scheduling resource intervals including an uplink semi-persistent scheduling resource interval and a downlink semi-persistent scheduling resource interval, both of which take the same value; and Then the semi-persistent scheduling parameter configuring unit 32 is particularly configured to configure the UE with the semi-persistent scheduling resource intervals according to a QoS and an arrival characteristic configuration of a service data packet of the access service.

Preferably when service data of a plurality of access services of the UE needs to be transmitted in the semi-persistent scheduling scheme, the semi-persistent scheduling parameter configuring unit 32 is particularly configured to configure semi-persistent scheduling resource intervals corresponding to each of the access services according to a QoS and an arrival characteristic of a service data packet of the access service and to configure the semi-persistent scheduling resource intervals of the UE as the smallest ones of the semi-persistent scheduling resource intervals corresponding to the plurality of access services.

Preferably the semi-persistent scheduling resource allocating unit 33 is particularly configured to determine the amount of data, a TB size, to be borne on the allocated resource from an arrival characteristic of a service data packet of the current access service of the UE and the semi-persistent scheduling resource intervals among the semi-persistent scheduling parameters; to determine an MCS level supported by the UE from a channel condition of the UE; and to determine the number of PRBs for transmitting the service data from the TB size and the MCS level, and to allocate the corresponding number of PRBs.

Preferably the apparatus can further include:

A quality of service determining unit 36 configured to determine a QoS of the current access service of the UE from a time of arrival of a service data packet and the amount of data of the access service, and a data bearing capacity of the allocated semi-persistent scheduling resource; and A dynamic scheduling resource allocating unit 37 configured to allocate a dynamic scheduling resource for a part of the service data of the access service and to transmit the part of the service data on the allocated dynamic scheduling resource in a dynamic scheduling scheme when the QoS determined by the quality of service determining unit 36 is below a preset QoS threshold; or Alternatively, the apparatus can further include:

A dynamic scheduling resource allocating unit 37 configured to allocate a dynamic scheduling resource for a part of the service data of the access service and to transmit the part of the service data on the allocated dynamic scheduling resource in a dynamic scheduling scheme when the length of time t for which the service data, of the UE, for which the semi-persistent scheduling resource has been allocated waits for scheduling in a buffer area is above a preset delay $\tau_1$.

An embodiment of the invention further provides an eNB arranged with the foregoing shared channel scheduling apparatus.

In the embodiments of the invention, on one hand, service data can be transmitted in a semi-persistent scheduling scheme for an access service of a UE (possibly including a data service and a voice service), and since there is an insignificant demand for a downlink control channel (e.g., a PDCCH channel) in transmission of data in the semi-persistent scheduling scheme and there are a large number of data services, an overhead of indication signaling on the downlink control channel in uplink and downlink transmission of data is lowered as a whole to thereby lower inter-cell interference of the downlink control channel; and on the other hand, a semi-persistent scheduling resource for transmitting the service data is allocated for the UE according to the semi-persistent scheduling parameters to thereby guarantee the performance of reception by the UE on the downlink control channel and improve a QoS and a cell spectrum efficiency of the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A resource scheduling method, comprising:
   determining whether to set a semi-persistent scheduling scheme for a User Equipment, UE, upon determining a cell serving the UE as an interference limited cell with a traffic load of a downlink control channel of the interference limited cell being above a preset traffic load threshold;
   configuring the UE with semi-persistent scheduling parameters upon determining the semi-persistent scheduling scheme to be set for the UE;
   allocating a semi-persistent scheduling resource for transmitting service data of an access service for the UE according to the semi-persistent scheduling parameters upon determining the UE to transmit the service data in the semi-persistent scheduling scheme; and
   sending resource scheduling information of the allocated semi-persistent scheduling resource to the UE on the downlink control channel of the UE.

2. The method according to claim 1, wherein determining the traffic load of the downlink control channel of the interference limited cell comprises:
   determining a traffic load of the downlink control channel in the interference-limited cell in a current cycle from a traffic load of the downlink control channel in a preceding cycle, a resource utilization ratio of the downlink control channel in the current cycle and a smoothing coefficient.

3. The method according to claim 2, wherein the traffic load of the downlink control channel in the current cycle is determined in an equation of:

$$L_{PDCCH(n)} = (1-\alpha) \times L_{PDCCH(n-1)} + \alpha \times \eta_{PDDCH(n)},$$

wherein $L_{PDCCH(n)}$ is the traffic load of the downlink control channel in the current cycle, $L_{PDCCH(n-1)}$ is the traffic load of the downlink control channel in the preceding cycle, $\eta_{PDCCH(n)}$ the resource utilization ratio of the downlink control channel in the current cycle, and $\alpha$ is the smoothing coefficient.

4. The method according to claim 1, wherein the determining whether to set the semi-persistent scheduling scheme for the UE comprises:
   if at least one Guaranteed Bit Rate, GBR, service among current access services of the UE is determined, determining the semi-persistent scheduling scheme to be set for the UE; otherwise, determining the semi-persistent scheduling scheme not to be set for the UE; or
   determining the semi-persistent scheduling scheme to be set for the UE according to a preset strategy that the semi-persistent scheduling scheme shall be set for all UEs in the interference-limited cell by default.

5. The method according to claim 4, wherein the semi-persistent scheduling parameters comprise semi-persistent scheduling resource intervals, and the configuring the UE with the semi-persistent scheduling parameters comprises:
   configuring the UE with the semi-persistent scheduling resource intervals according to a Quality of Service, QoS, and an arrival characteristic of a service data packet of the access service.

6. The method according to claim 5, wherein when service data of a plurality of access services of the UE needs to be transmitted in the semi-persistent scheduling scheme, the configuring the UE with the semi-persistent scheduling parameters comprises:
   configuring semi-persistent scheduling resource intervals corresponding to each of the access services according to a QoS and an arrival characteristic of a service data packet of the access service; and
   configuring the semi-persistent scheduling resource intervals of the UE as smallest ones of semi-persistent scheduling resource intervals corresponding to the plurality of access services.

7. The method according to claim 1, wherein the semi-persistent scheduling parameters comprise semi-persistent scheduling resource intervals, and the allocating the semi-persistent scheduling resource for transmitting the service data for the UE according to the semi-persistent scheduling parameters comprises:
   determining an amount of data, a Transmission Block, TB, size, to be borne on the allocated resource from an arrival characteristic of a service data packet of the current access service of the UE and the semi-persistent scheduling resource intervals among the semi-persistent scheduling parameters;
   determining a Modulation and Coding Scheme, MCS, level supported by the UE from a channel condition of the UE; and
   determining a number of Physical Resource Blocks, PRBs, for transmitting the service data from the TB size and the MCS level, and allocating the corresponding number of PRBs.

8. The method according to claim 1, wherein after the resource scheduling information of the allocated semi-persistent scheduling resource is sent to the UE, the method further comprises:
   determining a QoS of the current access service of the UE from a time of arrival of a service data packet and an amount of data of the access service, and a data bearing capacity of the allocated semi-persistent scheduling resource; and
   allocating a dynamic scheduling resource for a part of the service data of the access service and transmitting the part of the service data on the allocated dynamic scheduling resource in a dynamic scheduling scheme when the QoS is below a preset QoS threshold.

9. The method according to claim 1, wherein after the resource scheduling information of the allocated semi-persistent scheduling resource is sent to the UE, the method further comprises:
   allocating a dynamic scheduling resource for a part of the service data of the access service and transmitting the part of the service data on the allocated dynamic scheduling resource in a dynamic scheduling scheme when a length of time t for which the service data, of the UE, for which the semi-persistent scheduling resource has been allocated waits for scheduling in a buffer area is above a preset delay $\tau_1$.

10. A resource scheduling apparatus, comprising:
    a semi-persistent scheduling determining unit configured to determine whether to set a semi-persistent scheduling scheme for a User Equipment, UE, upon determining a cell serving the UE as an interference limited cell with a traffic load of a downlink control channel of the interference limited cell being above a preset traffic load threshold;
    a semi-persistent scheduling parameter configuring unit configured to configure the UE with semi-persistent scheduling parameters when the semi-persistent scheduling determining unit determines the semi-persistent scheduling scheme to be set for the UE;

a semi-persistent scheduling resource allocating unit configured to allocate a semi-persistent scheduling resource for transmitting service data of an access service for the UE according to the semi-persistent scheduling parameters configured for the UE by the semi-persistent scheduling parameter configuring unit when the UE is determined to transmit the service data in the semi-persistent scheduling scheme; and a semi-persistent scheduling resource notifying unit configured to send resource scheduling information of the semi-persistent scheduling resource, for transmitting the service data, allocated for the UE by the semi-persistent scheduling resource allocating unit to the UE on the downlink control channel of the UE.

11. The apparatus according to claim 10, further comprising:
a downlink control channel load determining unit configured to determine a traffic load of the downlink control channel in the interference-limited cell in a current cycle from a traffic load of the downlink control channel in a preceding cycle, a resource utilization ratio of the downlink control channel in the current cycle and a smoothing coefficient.

12. The apparatus according to claim 10, wherein the semi-persistent scheduling determining unit is further configured to determine the semi-persistent scheduling scheme to be set for the UE if at least one Guaranteed Bit Rate, GBR, service among current access services of the UE is determined, and otherwise, determine the semi-persistent scheduling scheme not to be set for the UE; or to determine the semi-persistent scheduling scheme to be set for the UE according to a preset strategy that the semi-persistent scheduling scheme shall be set for all UEs in the interference-limited cell by default.

13. The apparatus according to claim 12, wherein the semi-persistent scheduling parameters comprise semi-persistent scheduling resource intervals; and
the semi-persistent scheduling parameter configuring unit is further configured to configure the UE with the semi-persistent scheduling resource intervals according to a Quality of Service, QoS, and an arrival characteristic of a service data packet of the access service.

14. The apparatus according to claim 13, wherein when service data of a plurality of access services of the UE needs to be transmitted in the semi-persistent scheduling scheme, the semi-persistent scheduling parameter configuring unit is further configured:
to configure semi-persistent scheduling resource intervals corresponding to each of the access services according to a QoS and an arrival characteristic of a service data packet of the access service; and
to configure the semi-persistent scheduling resource intervals of the UE as smallest ones of semi-persistent scheduling resource intervals corresponding to the plurality of access services.

15. The apparatus according to claim 10, wherein the semi-persistent scheduling parameters comprise semi-persistent scheduling resource intervals, and the semi-persistent scheduling resource allocating unit is further configured:
to determine an amount of data, a Transmission Block, TB, size, to be borne on the allocated resource from an arrival characteristic of a service data packet of the current access service of the UE and the semi-persistent scheduling resource intervals among the semi-persistent scheduling parameters;
to determine a Modulation and Coding Scheme, MCS, level supported by the UE from a channel condition of the UE; and
to determine a number of Physical Resource Blocks, PRBs, for transmitting the service data from the TB size and the MCS level, and to allocate the corresponding number of PRBs.

16. The apparatus according to claim 10, further comprising:
a quality of service determining unit configured to determine a QoS of the current access service of the UE from a time of arrival of a service data packet and an amount of data of the access service, and a data bearing capacity of the allocated semi-persistent scheduling resource; and
a dynamic scheduling resource allocating unit configured to allocate a dynamic scheduling resource for a part of the service data of the access service and to transmit the part of the service data on the allocated dynamic scheduling resource in a dynamic scheduling scheme when the QoS determined by the quality of service determining unit is below a preset QoS threshold.

17. The apparatus according to claim 10, further comprising:
a dynamic scheduling resource allocating unit configured to allocate a dynamic scheduling resource for a part of the service data of the access service and to transmit the part of the service data on the allocated dynamic scheduling resource in a dynamic scheduling scheme when a length of time t for which the service data, of the UE, for which the semi-persistent scheduling resource has been allocated waits for scheduling in a buffer area is above a preset delay $\tau_1$.

18. An eNB, comprising the apparatus according to claim 10.

* * * * *